United States Patent

[11] 3,599,644

[72] Inventors Darwin Bichel;
Robert L. Malcolm, both of East Moline, Ill.
[21] Appl. No. 751,019
[22] Filed June 25, 1968
[45] Patented Aug. 17, 1971
[73] Assignee Deere & Company
Moline, Ill.
Continuation of application Ser. No. 470,807, July 9, 1965, now abandoned.

[54] STRAW WALKER FOR A COMBINE
7 Claims, 5 Drawing Figs.
[52] U.S. Cl. .................................................. 130/26
[51] Int. Cl. ............................................. A01f 12/30
[50] Field of Search .......................................... 130/26

[56] References Cited
UNITED STATES PATENTS
| 1,864,005 | 6/1932 | Taylor | 130/26 |
| 2,814,300 | 11/1957 | Oberholtz | 130/26 |

FOREIGN PATENTS
| 859,997 | 1/1961 | Great Britain | 130/26 |

Primary Examiner—Antonie F. Guida
Attorneys—H. Vincent Harsha, Harold M. Knoth, William A. Murray and John M. Nolan ABSTRACT: A straw walker mounted in a combine rearwardly of the threshing cylinder for receiving grain and straw therefrom. The straw walker oscillates in a fore-and-aft direction to agitate the material, moving the straw out the rear of the combine while permitting the grain to drop through. The walker has opposite fore-and-aft extending side panels with linear, saw-toothed upper edges, and a stepped bottom, each step having a large number of apertures through which the grain drops.

INVENTORS
D. C. BICHEL
R. L. MALCOLM

BY John M. Nolan
ATTORNEY

INVENTORS
D. C. BICHEL
R. L. MALCOLM

BY John M. Nolan

ATTORNEY 3,599,644

1

STRAW WALKER FOR A COMBINE

CROSS REFERENCE TO RELATED APPLICATION

This is a continuation of U.S. Pat. application Ser. No. 470,807 filed 9 July 1965, now abandoned.

BACKGROUND OF THE INVENTION

This invention relates to the separation of grain and similar crops and more particularly to an improved straw walker for a combine or the like.

In a conventional combine, the grain or similar crop is harvested and fed to a threshing cylinder having an associated concave which separates the majority of the grain from the straw. The remaining grain and straw are thrown rearwardly onto straw walkers which are conventionally oscillated longitudinally to move the straw out the rear of the combine while the grain and chaff drop through the straw walkers and are conveyed to grain-cleaning means.

Many forms and configurations of straw walkers have previously been devised to move the straw while separating the grain. However, most straw walkers, and particularly those in use today, are formed with a bottom portion extending between opposite upright side panels. Generally, the side panels have saw-toothed upper edges and in most of the combines now on the market, both the side panels and the bottom portion are stepped, although it is known to provide a straw walker with a generally linear bottom and side panels that also have a linear upper edge. In any event, it has been conventional to make the upper edges of the side panels approximately parallel to the bottom portion.

SUMMARY OF THE INVENTION

According to the present invention, a novel straw walker construction is provided for efficiently separating the grain from the straw while quickly moving the straw out the rear of the combine. The straw walker also has a relatively low profile to allow a greater amplitude of oscillation within a given space within the combine.

Accordingly, the primary object of the present invention is to provide an improved straw walker for a combine which more efficiently separates the grain from the straw and rapidly moves the straw out the rear of the combine to increase the capacity of the walker.

A more specific object is to provide a straw walker having a steplike bottom portion extending between low profile side panels, which have linear saw-toothed upper edges which carry the majority of the straw rearwardly in response to oscillation of the straw walker.

Another object is to provide a low profile straw walker to allow a greater amplitude of straw walker oscillation in a given combine space.

Another object is to provide a straw walker having side panels with linear saw-toothed upper edges which are inclined upwardly and rearwardly at a lesser angle than the steps of the steplike bottom of the walker.

Another object is to provide such a straw walker having a corrugated steplike bottom portion in which the uppermost point of each step lies approximately in the same plane as the upper edges of the side panels.

Another object is to provide a straw walker having an improved bottom portion through which the grain falls and which is not subject to clogging.

Still another object is to provide such a straw walker of simple but rugged construction, and which is relatively inexpensive to manufacture.

These and other objects will become apparent from a consideration of the following detailed description and accompanying drawings.

2

DESCRIPTION OF THE PREFERRED EMBODIMENT

Figure 1:
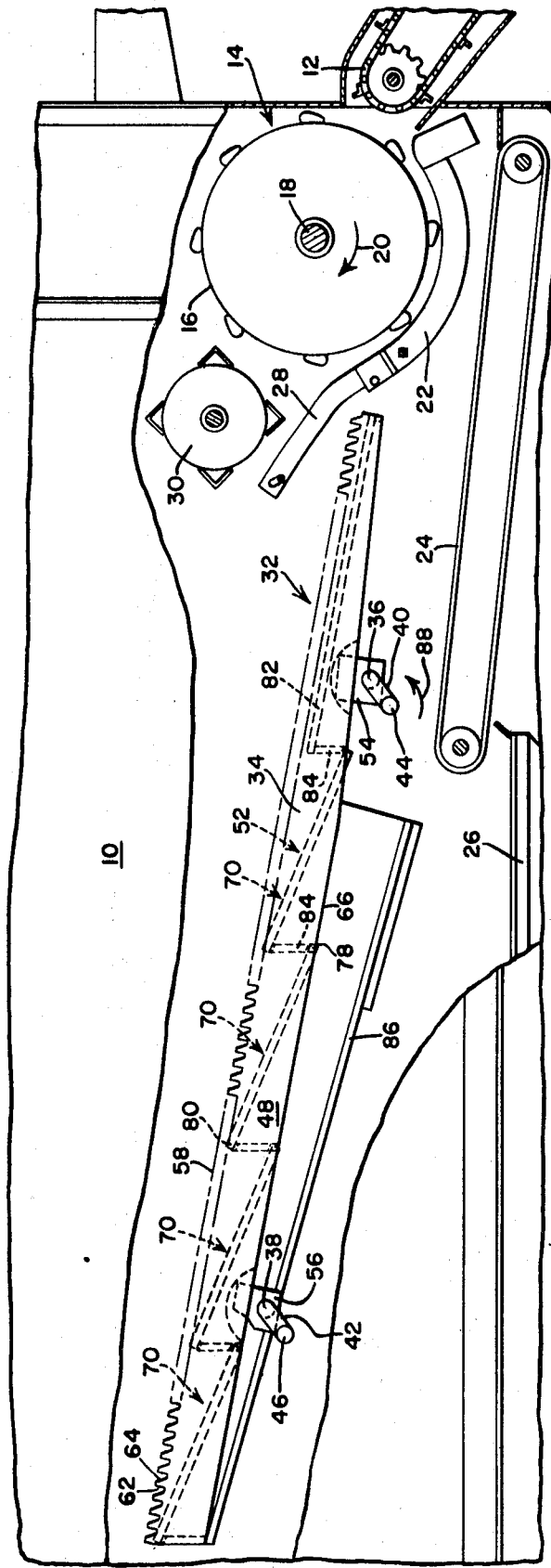
FIG. 1 is a side elevation view of the grain separating mechanism of a typical combine, including the novel straw walker.
Figure 3:
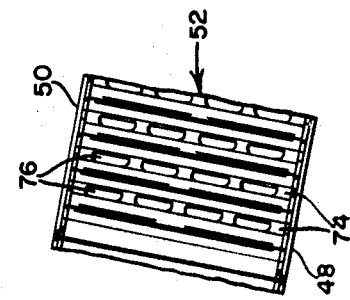
FIG. 3 is a plan view of a portion of the straw walker.

In the drawings, the numeral 10 represents a portion of the main body of the combine. A conventional harvesting mechanism (not shown) is forwardly disposed on the body 10 and includes a conveyor 12 for delivering the harvested crop rearwardly within the combine to a threshing mechanism indicated generally by the numeral 14.

It is to be understood that such words as "forward", "rear", "upper", "lower", "top", "bottom", etc. are mere words of convenience used to more clearly describe the invention and are not to be construed as limiting terms.

The threshing mechanism includes a threshing cylinder 16, mounted on an axial shaft 18 for rotation about a horizontal axis in the direction of the arrow 20, and a conventional concave 22, associated with the threshing cylinder 16. As the crop moves between the threshing cylinder 16 and the concave 22 most of the grain is separated from the straw and falls through the concave onto a conveyor 24, which moves the grain rearwardly to a grain cleaning means 26. The remaining grain and straw are thrown rearwardly by the threshing cylinder and moved rearwardly over a beater grate 28 by a beater 30 to straw-walking means indicated generally by the numeral 32. The straw-walking means moves the straw rearwardly within the combine while separating the remaining grain, which drops onto the grain-cleaning means 26. The beater 30 is mounted for rotation in the same direction as the threshing cylinder 16 about an axis parallel to and spaced rearwardly from the threshing cylinder axis.

The straw-walking means 32 comprises a plurality of elongated, fore-and-aft extending straw walkers 34 mounted side by side on a pair of parallel and longitudinally spaced crank shafts 36 and 38, which have parallel crank arms 40 and 42 respectively for oscillating movement of the straw walkers in a longitudinal, vertical plane in response to rotation of the crank shafts about their respective axes 44 and 46.

While only a single straw walker 34 is shown in the drawings, the straw-walking means can include any number of such walkers, the number utilized depending on the size and capacity of the combine. The walkers are mounted side by side in the conventional manner with each walker preferably being out of phase with the adjacent walker.

Each straw walker 34 includes a pair of opposite, longitudinally extending upright side panels 48 and 50 and a stepped bottom portion 52 which extends between said side panels. A pair of journal plates 54 and 56 depend from each side panel and journal the crank shafts 36 and 38 respectively. The side panels 48 and 50 have linear, saw-toothed, upper edges 58 and 60 respectively, the rear edge 62 of each saw tooth being approximately upright and the forward edge 64 of each tooth extending in a downwardly and forwardly direction. The edges 58 and 60 are inclined upwardly and rearwardly at approximately an 11° angle from the horizontal.

The bottom portion 52 has several relatively large steps 70 which extend between the top edges 58 and 60 and the bottom edges 66 and 68 of the side panels 48 and 50 respectively. While the straw walker is shown to have five steps 70 in the drawings, the invention is not limited to a five-step straw walker, although it is preferable that the straw walker has several steps. Each step 70 is formed by a corrugated rectangular bottom member 72 having a plurality of parallel grooves 74 which extend between the side panels 48 and 50. A plurality of apertures 76 extend through each bottom member at the bottom of said grooves and are capable of passing and separating the grain, but sufficiently small to hold most of the straw.

Each bottom member 72 is affixed at opposite edges to the side panels 48 and 50 and preferably extend in an upwardly and rearwardly direction at approximately a 22° angle from the horizontal, with the forward edge 78 of each bottom member being proximate the bottom edges 66 and 68, and the rear edge 80 of each bottom member being proximate the upper edges 58 and 60 of the side panels 48 and 50. A front bottom member 82 extends rearwardly approximately parallel to the upper edges 58 and 60 at a lesser angle relative to the horizontal than the remaining step members 72, which have approximately twice the angle of inclination as the edges 58 and 60.

An approximately vertical riser 84 extends downwardly from the rear edge 80 of each step member to the forward edge 78 of the succeeding step member to close the bottom portion 52 except for the apertures 76. A pan 86 depends from each straw walker and extends under the rear portion thereof for receiving the grain as it passes through the apertures 76 and conveying it forwardly by gravity flow to the grain-cleaning means 26.

In operation, the straw and unseparated grain are thrown rearwardly onto the adjacent longitudinally extending straw walkers 34 by the threshing mechanism 14. Each straw walker is inclined upwardly toward the rear and is mounted on the crank shafts 36 and 38 via the plates 54 and 56 for circular oscillating motion in the direction of the arrow 88 (counterclockwise in FIG. 1) in response to rotation of the crank shafts.

The majority of the straw is carried on the saw-toothed upper edges 58 and 60 of the side panels 48 and 50, and most of the remaining material is carried on top of the corrugated bottom member 72, keeping the grooves 74 and consequently the apertures 76 relatively clear to facilitate the passage of the separated grain. The straw walkers move rearwardly during the top half of their circular path and thereby move the material rearwardly, while tumbling and agitating the straw to separate the grain. The straw is then moved over the rear end of the straw walker where it falls to the ground. The rear edges 62 of the saw teeth and the step member 84 are approximately vertical, while the forward edges 64 of the saw teeth and the bottom member 72 are inclined to allow only rearward motion of the straw on the walker.

It is desirable that the upper edges 58 and 60 be spaced above the bottom member 72 to hold most of the straw above the bottom member as previously described. However, the upper edges 58 and 60 are linear rather than stepped and generally parallel to the bottom member 72 to reduce the height of the straw walker. With a lower profile straw walker, as a result of the linear upper edges 58 and 60, longer crank shaft arms 40 and 42 can be used to give a greater amplitude of oscillation within any given amount of space in the combine. The linear upper edges also reduce the angle at which the straw must be raised when it is moved upwardly and rearwardly, and therefore the straw on the upper edges moves at a greater rate than the material on the more steeply inclined bottom members. Thus, the straw is moved quickly out the rear of the combine while the material that contains the grain is retained for a longer period on the walkers. This increases both the efficiency of grain separation and the capacity of the walkers. The greater amplitude of oscillation for a given space further increases the efficiency and capacity of the walkers over known straw walkers.

Figure 4:
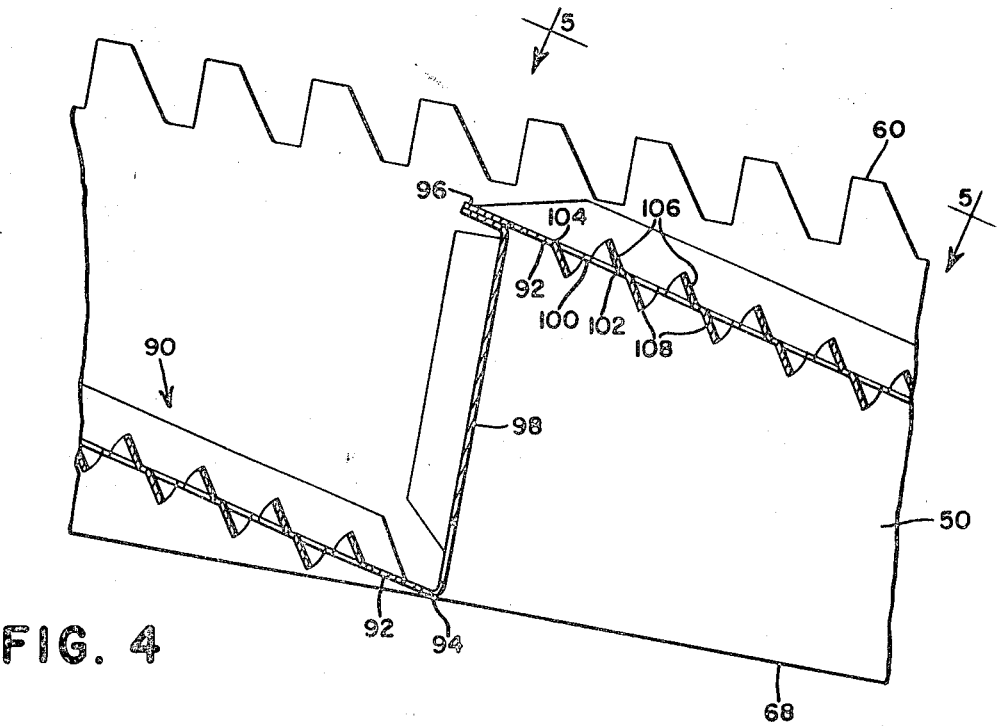
FIG. 4 is an enlarged elevation view in section showing a portion of a slightly different embodiment of the invention having a different type of straw walker bottom.
Figure 5:
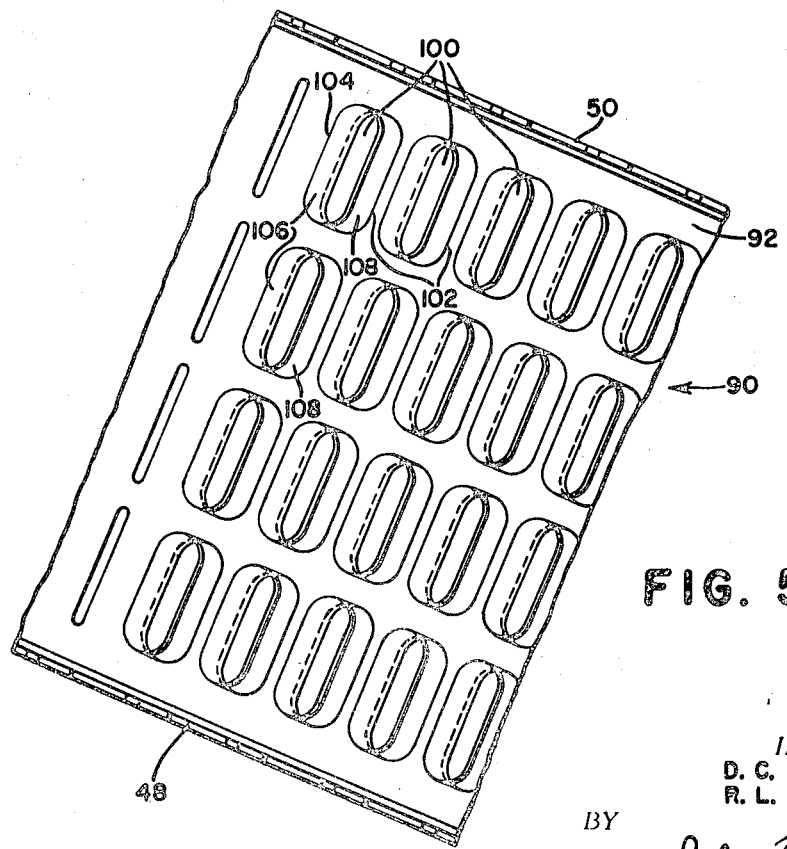
FIG. 5 is a plan view of a portion of the straw walker shown in FIG. 4.

A slightly different embodiment of the invention is shown in FIGS. 4 and 5, the straw walker having the same general configuration as previously described and again including a pair of opposite upright side panels 48 and 50 having bottom edges 66 and 68 and linear, saw-toothed upper edges 58 and 60. A stepped bottom portion 90 extends between the side panels 48 and 50 and includes a plurality of rectangular platelike bottom members 92 having forward and rear edges 94 and 96, the forward edge 94 of each bottom member extending between the bottom edges 66 and 68 of the side panels 48 and 50 and the rear edge 96 extending approximately between the upper edges 58 and 60 of the side panels 48 and 50.

Figure 2:
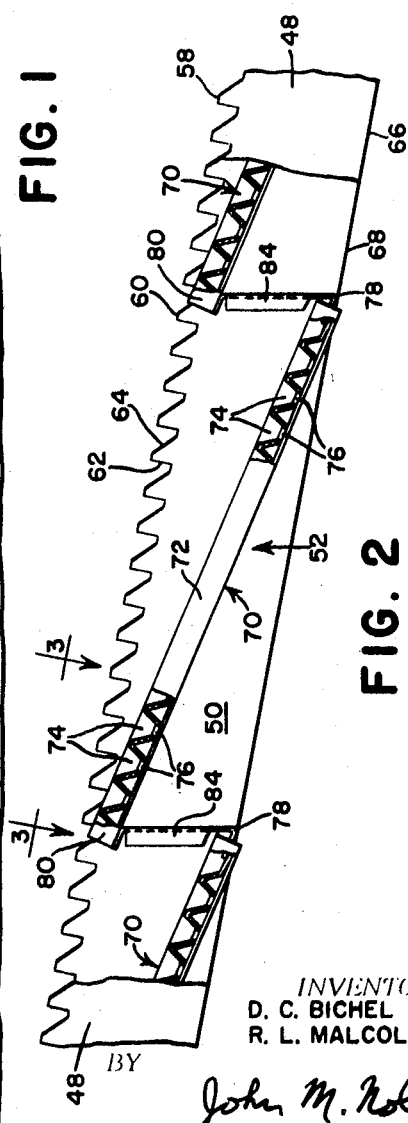
FIG. 2 is an enlarged elevation view of a portion of a straw walker having part of a side panel broken away to show the bottom portion of the straw walker in section.

Only the rear portion of one bottom member and the forward portion of the succeeding bottom member are shown in FIG. 4, the succeeding bottom member being mounted between the side panels in the same manner as the bottom members 72 shown in FIGS. 1 and 2. An approximately vertical riser 98 extends downwardly from the rear edge 96 of each bottom member 92 to the forward edge 94 of the succeeding bottom member 92.

A plurality of transversely elongated apertures or slots 100 extend through the bottom members 92, each aperture having a forward edge 102 and a rear edge 104. A transverse lip 106 extends upwardly and rearwardly from each forward edge 102 at an approximately 45° angle from the bottom member 92, the lips 106 overhanging slightly less than one-half of each aperture 100. A second transverse lip 108 extends forwardly and downwardly from each rear edge 104 at an approximately 45° angle from the bottom member 92 underlying slightly less than one-half of each aperture 100.

The apertures 100 and lips 108 are preferably formed by providing the bottom member 92 with a plurality of transverse slots such as the slots 110 in FIG. 5 and bending the bottom member adjacent the forward edge of the slot upwardly to form the lip 106 and bending the bottom member area adjacent the rear edge downwardly to form the lip 108.

This particular design of the bottom member 92 and apertures 100 is particularly advantageous when stalk crops, such as corn or the like, are being harvested, the lips 106 maintaining the stalks and ears above the apertures 100, preventing the clogging of the apertures.

Other features and advantages of the present invention will readily occur to those skilled in the art, as will many modifications and alterations in the preferred embodiment of the invention described herein, all of which may be achieved without departing from the spirit and the scope of the invention.

We claim:

1. In a combine having a main separator body with a forward, axially transverse threshing cylinder mounted therein and adapted to propel the threshed crop rearwardly in the body, the combination therewith of a plurality of straw walkers mounted side by side for fore-and-aft oscillation within the body rearwardly of the threshing cylinder and adapted to receive the threshed crop therefrom, each straw walker including a pair of upright, opposite, fore-and-aft elongated side panels having generally parallel, substantially linear, saw-toothed upper edges inclined rearwardly and upwardly at a relatively small angle and a steplike bottom portion having a large number of relatively small apertures and a plurality of steps including a generally rectangular bottom member extending between the opposite side panels and inclined rearwardly and upwardly at a substantially greater angle than the upper edges of the side panels.

2. The invention defined in claim 1 wherein each straw walker has at least three but less than 10 steps.

3. The invention defined in claim 2 wherein the upper edge of the side panels has approximately one-half the angle of upward and rearward inclination as the bottom members.

4. The invention defined in claim 1 wherein the bottom members are corrugated and have a plurality of transverse grooves, a plurality of said apertures being disposed in each groove.

5. The invention defined in claim 1 wherein the forward edge of each bottom member extends between the side panels proximate to the lower edge of the panels and the rear edge of each bottom member extends between said side panels proximate to their top edge, and the bottom portion also includes a plurality of generally upright riser members, each riser being disposed between the forward edge of one bottom member and the rearward edge of the adjacent bottom member.

6. The invention defined in claim 1 wherein the bottom portion also includes a front step having a bottom member inclined upwardly and rearwardly at approximately the same angle as the upper edges.

7. A straw walker for a combine comprising: a pair of elongated, upright, opposite, fore-and-aft extending, side panels, having approximately linear, saw-toothed upper edges; and a steplike bottom portion, extending between said side panels and having a relatively few number of steps, each step being formed by a rectangular, upwardly and rearwardly extending bottom member having a plurality of apertures, the opposite side edges of said bottom member being affixed to said side panels with the front edge extending between the side panels proximate to the lower edge of said panels and the rear edge extending between the panels proximate to the upper edge, and an approximately vertical riser member extending between the rear edge of each bottom member and the forward edge of the succeeding bottom member.